United States Patent [19]

Iyer et al.

[11] Patent Number: 4,657,950

[45] Date of Patent: Apr. 14, 1987

[54] REFRACTORY BINDERS

[75] Inventors: Raja Iyer, Hazelcrest; Rasik C. Shah, Des Plaines; Robert A. Laitar, Woodridge, all of Ill.

[73] Assignee: Acme Resin Corporation, Westchester, Ill.

[21] Appl. No.: 660,169

[22] Filed: Oct. 12, 1984

[51] Int. Cl.[4] .................. C08K 3/22; C08L 61/14; C04B 26/12
[52] U.S. Cl. .................... 523/145; 523/147; 524/594; 524/424; 528/139; 528/140; 528/142
[58] Field of Search ............... 523/145, 147; 528/129, 528/142

[56] References Cited

U.S. PATENT DOCUMENTS

| | | | |
|---|---|---|---|
| 2,079,633 | 5/1937 | Rothrock. | |
| 2,376,213 | 5/1945 | Watson | 528/129 |
| 2,437,981 | 3/1948 | Stephan | 528/142 |
| 2,692,865 | 10/1954 | Harris | 528/129 |
| 2,962,459 | 11/1960 | Ash | 528/129 |
| 3,010,919 | 11/1961 | Mackinney | 528/129 |
| 3,039,915 | 6/1962 | Raphael | 528/129 |
| 3,156,670 | 11/1964 | Soldatos | 528/129 |
| 3,894,981 | 7/1975 | Kruglikov et al. . | |
| 4,120,847 | 10/1978 | Culbertson | 528/140 |
| 4,255,554 | 3/1981 | Wuskell | 528/129 |
| 4,311,619 | 1/1982 | Seeney | 523/145 |
| 4,317,896 | 3/1982 | Holik | 523/145 |
| 4,371,649 | 2/1983 | Hernandez | 523/145 |
| 4,427,800 | 1/1984 | Nakamura et al. . | |
| 4,448,951 | 5/1984 | Rupert | 528/129 |
| 4,473,669 | 9/1984 | Rupert | 528/129 |
| 4,495,316 | 1/1985 | Armbruster | 523/145 |

FOREIGN PATENT DOCUMENTS

| | | | |
|---|---|---|---|
| 1022005 | 1/1958 | Fed. Rep. of Germany . | |
| 1115410 | 4/1956 | France . | |
| 47-41645 | 10/1972 | Japan | 523/145 |
| 615335 | 1/1949 | United Kingdom . | |
| 950291 | 2/1964 | United Kingdom | 523/145 |
| 565923 | 8/1977 | U.S.S.R. | 523/145 |
| 197708 | 8/1977 | U.S.S.R. | 523/145 |

OTHER PUBLICATIONS

Whitehouse, et al, *Phenolic Resins;* pp. 66-69; Iliffe Books Ltd; London 1967.

*Primary Examiner*—C. Warren Ivy
*Attorney, Agent, or Firm*—Stanley M. Parmerter

[57] ABSTRACT

Refractory shaped articles are prepared by heating refractory mixes comprised of refractory particles and an alkoxy modified phenolic resole resin having at least one alkoxy methylene group for every 20 phenolic hydroxyl groups.

14 Claims, 1 Drawing Figure

REFRACTORY BINDERS

FIELD OF THE INVENTION

This invention relates to modified phenolic resole resins useful as refractory binders. The binders exhibit excellent storage properties both before and after incorporation into the refractory mix.

BACKGROUND OF THE INVENTION

A refractory is a ceramic material of low thermal conductivity characterized by the ability to withstand extremely high temperatures. Refractories are used for lining steel furnaces and other high-temperature applications. They are normally cast in the form of brick with some type of binder to assure their stability.

The three groups of refractories include acidic refractories, such as silica; basic refractories, such as magnesite; and amphoteric refractories, such as alumina. In recent years, there has been an increased demand for refractory articles made from basic materials, such as magnesia.

Phenolic resins are widely used as refractory binders. However, they have certain drawbacks when used as binders for magnesia. When magnesia granules are mixed with conventional resole resins, the mixtures tend to harden in a comparatively short time. This reduces the time that the mix can be retained before it must be shaped into bricks or other desired shapes. Furthermore, the articles produced from these mixtures often show poor strength and durability. The phenolic resole resins themselves also tend to be unstable and may require refrigeration if they are stored for any period of time.

A modified phenolic resole resin has been discovered which does not have the shortcomings of conventional resole resins. This resin can be stored at room temperature for long periods of time without undergoing deterioration. In addition, mixes of magnesite particles and this resin show excellent storage stability. It has also been found that this resin can be used as a binder for acidic and amphoteric particles, such as silica and alumina.

SUMMARY OF THE INVENTION

In accordance with this invention, there is provided a modified phenolic resin for refractory uses, consisting essentially of an alkoxy modified phenolic resole resin having at least one alkoxy methylene group for every 20 phenolic hydroxyl groups, said alkoxy modified liquid phenolic resole resin being capable of forming an 80% by weight solution in a polar solvent, which solution shows an increase in viscosity of less than about 20% per week when held at 40° C. in a closed container.

Also provided, in accordance with this invention, is a refractory mix consisting essentially of refractory particles, an alkoxy modified phenolic resole resin having at least one alkoxy methylene group for every 20 phenolic hydroxyl groups, said alkoxy modified liquid phenolic resole resin being capable of forming an 80% by weight solution in a polar solvent, which solution shows an increase in viscosity of less than about 20% per week when held at 40° C. in a closed container.

Further provided, in accordance with this invention, is a refractory shaped article prepared by heating the refractory mix of this invention.

BRIEF DESCRIPTION OF THE DRAWING

The drawing is a plot of the viscosity versus storage time at 40° C. for several resole resins.

DETAILED DESCRIPTION OF THE INVENTION

Figure 1:
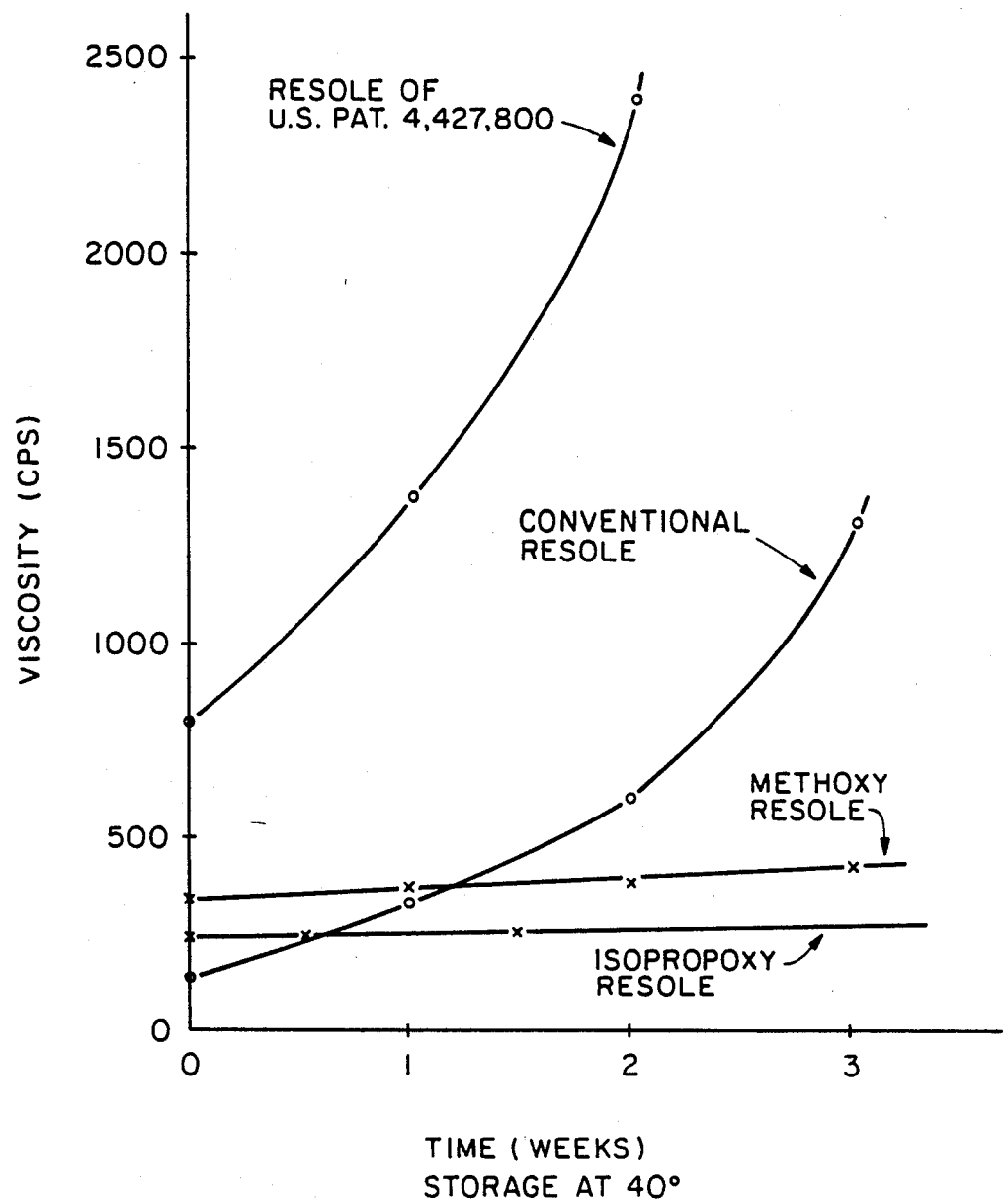

In the practice of this invention, the alkoxy modified phenolic resole resins can be produced by heating a mixture of an aldehyde, a phenol and a lower aliphatic alcohol in the presence of a divalent metal ion catalyst.

Alternatively, an unmodified phenolic resole resin can be prepared by heating the aldehyde and phenol in the presence of the catalyst. This resin is then modified by heating with a lower aliphatic alcohol at a pH below 6.5 followed by dehydration to remove water produced in the reaction with the alcohol.

The preferred method for producing the alkoxy modified phenolic resole resins of the present invention involves reacting the phenol, the aliphatic alcohol and aqueous formaldehyde at an elevated temperature in the presence of a divalent metal ion catalyst. Excess water is removed by evaporation under reduced pressure. If desired, the dehydrated product can be held at an elevated temperature under vacuum to increase the viscosity of the product. The resulting resin is diluted with a polar solvent to obtain a product with the desired viscosity.

Phenols suitable for preparing the modified phenolic resole resins of this invention are generally any of the phenols which may be utilized in the formation of phenolic resins, and include substituted phenols, as well as unsubstituted phenol per se. The nature of the substituent can vary widely, and exemplary substituted phenols include alkyl-substituted phenols, aryl-substituted phenols, cycloalkyl-substituted phenols, alkenyl-substituted phenols, alkoxy-substituted phenols, aryloxy-substituted phenols, and halogen-substituted phenols. Specific suitable exemplary phenols include in addition to phenol per se, o-cresol, m-cresol, p-cresol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. A preferred phenolic compound is phenol itself.

The aldehyde employed in the formation of the modified phenolic resole resin employed in this invention can also vary widely. Suitable aldehydes include any of the aldehydes heretofore employed in the formation of phenolic resins, such as formaldehyde, acetaldehyde, propionaldehyde, and benzaldehyde. In general, the aldehydes employed contain from 1 to 8 carbon atoms. The most preferred aldehyde is formaldehyde which may be used either as its aqueous solution or in its nonaqueous form as one of its solid polymers, such as paraformaldehyde.

Alcohols useful for preparing the alkoxy modified phenolic resole resins of this invention are generally primary and secondary monohydric aliphatic alcohols containing from 1 to 8 carbon atoms. Examples of useful alcohols are methanol, ethanol, n-propanol, isoproponal, n-butanol, and hexanol. Methanol is a preferred alcohol.

Metal ion catalysts useful in production of the modified phenolic resole resins of the present invention include salts of the divalent ions of Mn, Zn, Cd, Mg, Co, Ni, Fe, Pb, Ca, and Ba. Tetraalkoxy titanium compounds of the formula Ti(OR)$_4$, where R is an alkyl group containing from 3 to 8 carbon atoms, are also useful catalysts for this reaction. A preferred catalyst is zinc acetate.

At least 1 mole of aldehyde per mole of phenol is used to make the resole resins of this invention. It is preferable that the molar ratio of aldehyde to phenol be in the range of from about 1.2:1 to about 2.2:1.

In the preparation of the alkoxy modified phenolic resole resins of the present invention, sufficient alcohol is used to ensure that the alkoxy modified phenolic resole resin will have at least one alkoxy methylene group for every 20 phenolic hydroxyl groups present in the resin. The alkoxy methylene groups have the general formula —(CH$_2$O)$_n$R where R is the alkyl group of the alcohol used, and n is a small positive integer. These groups are substituents at the positions ortho and para to the phenolic hydroxyl groups in the resin. When the molar ratio of alcohol to phenol in the reaction mixture is 1:1 or higher, the resulting products are satisfactory for use in the process of this invention, but the presence of larger amounts of alcohol tend to slow down the reaction between the phenol and the aldehyde and leave considerable amounts of unreacted alcohol to be evaporated at the end of the reaction.

When the modified phenolic resole resins of this invention are used as binders for refractory material, they are mixed with the refractory material in the presence of a polar solvent to give a refractory mix. The modified phenolic resole resin comprises from about 1% to about 25% by weight of the mix. This refractory mix is then used to make refractory articles of various shapes or forms. The mix in the desired form is heated to a high temperature to produce the hardened refractory shaped article.

The modified phenolic resole resins of this invention are particularly effective for refractory binder mixtures with basic refractory material, such as magnesia. However, they are also suitable for formulating refractory binder mixes with acidic materials, such as silica, and with neutral refractory materials, such as alumina. Other refractory materials, such as olivine, dolomite, chromite, zircon, and silicon carbide, can be used with the binders of this invention.

Polar solvents useful for preparing the refractory mixes of this invention include alcohols, ketones, and esters in which the resin is soluble. Exemplary compounds are methanol, ethanol, n-propanol, isopropanol, butanol, ethylene glycol, glycerine, acetone, butanone, cyclohexanone, and isophorone. Alcohols, such as isopropanol, are the preferred solvents. The refractory mix can contain small amounts of water, but for optimum stability of the mix, it is preferable that the water content be less than 5%.

The following examples illustrate the invention. It is to be understood that the examples are illustrative only and are not intended to limt the invention in any way. In the examples, all parts are percentages by weight unless otherwise indicated.

EXAMPLE 1

A solution of 4287 g (45.6 moles) of phenol, 4432 g (73.9 moles) of a 50% formaldehyde solution, 787 g (24.6 moles) of methanol, and 342 g of a 25% solution of zinc acetate in water was refluxed for about 11 hours until the free formaldehyde content was less than 3%.

The free formaldehyde was determined by the standard hydroxylamine-hydrochloride method. Then a solution of 23 g of citric acid in an equal amount of water was added, and water was removed from the mixture by heating at 55° C. under reduced pressure. The temperature of the reactor was then raised to 95° C. and heating was continued under vacuum until the viscosity (measured in a Model RVF Brookfield viscometer) of an 80% solution of the resin in methanol reached 400–450 centipoises (hereafter written cps) at 25° C. The resin was then cooled and diluted with 1 part by weight of methanol to each 4 parts by weight of resin. The resulting solution had a viscosity of 500 cps at 25° C. and a refractive index of 1.536 at 25° C. and contained 0.25% of free formaldehyde.

A refractory mix (Mix 1) was prepared by the following procedure. To 2.27 kg of magnesite (Grade SM-60, available from American Minerals Inc., New Castle, Del.) in a Hobart Kitchen Aid mixer was added a solution of 191.5 g of the resin in 63.8 g of isopropanol. The resin solution was added over a period of 60 seconds. The mixture was stirred for 2 minutes before a portion was removed and used immediately to prepare test core specimens. A second portion was used a week later to make additional tensile core specimens. The test specimens were American Foundry Society 1-inch dog bone tensile briquets, prepared using a Dietert sand rammer with ramming plate attachment and a two-part metal core box. Cores were heated in an oven maintained at 166° C. for 2 hours. The cores were then allowed to cool to room temperature and tested on a Detroit Testing Machine Company, Model CST tensile tester. Average tensile data are given in Table I for the cores made from the refractory mix immediately after its preparation, and for cores made from the refractory mix after it had stood for 1 week after its preparation.

Table I also includes similar tensile strength data for a refractory mix (Mix 2) that contained 15% less resin binder for a given amount of magnesite. Comparative test results are also reported in Table I for a commercial resole resin used as a refractory binder. The refractory mix prepared with a commercial resin was suitable for use immediately after mixing. However, as indicated in the table, the mixture containing this resin binder could not be rammed into the mold after it had been standing for 16 hours, and it was completely hard and unusable after it had been held for 1 week. In constrast, the refractory mixes of the present invention were still usable and gave cores of acceptable tensile strength even after the refractory mix had been held for 1 week.

TABLE I

| | Tensile Strength (psi) | |
| --- | --- | --- |
| Material Tested | Cores Formed Immediately After Mixing | Cores Formed 1 Week After Mixing |
| Mix 1 | 975 | 647 |
| Mix 2 | 810 | 690 |
| Comparative Test Mix[a] | 900 | —[b] |

[a]Test mixture was prepared using the same proportions as Mix 1. The resin was a conventional commercial resole resin used as a refractory binder containing 2.5% free formaldehyde, 15% water, and a viscosity of 120 cps (25° C.).
[b]The mixture was unusable after 16 hours and was completely hardened after standing 1 week at room temperature in a closed container.

EXAMPLE 2

The general procedure of Example 1 was followed except that the reaction was terminated when the viscosity of an 80% solution of the resin in isopropanol reached 160-250 cps. The resin was cooled and diluted with 1 part by weight of isopropanol to 4 parts by weight of resin. The resulting solution had a viscosity of 200 cps (25° C.), a refractive index of 1.5267 (25° C.), and contained 2.27% of free formaldehyde. Test cores were prepared using this binder with alumina and with silica, and the tensile strengths of the cores were compared with those prepared using a commercial resole resin binder with the same refractories. The alumina was Alcoa T-61, a 325-mesh calcined alumina, available from the Aluminum Company of America, Pittsburgh, Pa. The silica was a 140-mesh silica flour, available from the Ottawa Silica Company, Ottawa, Ill. In all cases, the mix contained 2.27 kg of the refractory, 163 g of the resin, and 63 g of added isopropanol. The results given in Table II indicate that the resins of the present invention give refractory articles prepared from alumina and silica with comparable strengths to those made from the same refractories using a commercial resole resin. All of the test specimens were baked shortly after the refractory mixes had been prepared.

Carbon-13 NMR analysis of the resin of this example gave a methylol group index of 2.1. The methylol group index is defined by Nakamura, et al, U.S. Pat. No. 4,427,800. Carbon absorption of the resin is determined in a carbon-13 NMR analytical instrument. The methylol group index is calculated by dividing the integrated value of carbon absorption as peak strength of methylol group shifting at 60-68 ppm by the peak strength of the carbon connected to the hydroxyl group of phenols shifting at 145-160 ppm.

Comparison of the integrated value of carbon absorption of the methoxy group shifting at 57-58 ppm with the peak strength of the carbon connected to the hydroxyl group of phenols shifting at 145-160 ppm indicated that the resin contained at least one methoxy methylene group for every 3.4 phenolic hydroxyl groups.

TABLE II

| Refractory Mix | Tensile Strength (psi) After Heating for | | | |
|---|---|---|---|---|
| | 1 hr | 1½ hr | 2 hr | 3 hr |
| Alumina + Resin of Example 2 | 321 | 336 | 376 | — |
| Alumina + Comparative Test Resin[a] | 358 | 415 | 502 | — |
| Silica + Resin of Example 2 | 204 | — | 225 | 200 |
| Silica + Comparative Test Resin[a] | 186 | — | 183 | 164 |

[a] Comparative test resin same as in Table I.

EXAMPLE 3

An isopropoxy modified phenolic resole resin was prepared by the general procedure of Example 1 using 1201 g (20 moles) of a 50% aqueous solution of formaldehyde, 1297 g (13.8 moles) of phenol, 213 g (3.55 moles) of isopropanol, and 104 g of a 25% aqueous solution of zinc acetate. When 4 parts by weight of the resin were diluted with one part by weight of isopropanol, the resulting solution had a viscosity of 252 cps (25° C.), a refractive index of 1.5307 (25° C.), and contained 2.82% of free formaldehyde. Carbon-13 NMR analysis of the resin showed that it had a methylol group index of 3.2 and that it contained one isopropoxy methylene group for every 20 phenolic hydroxyl groups.

Refractory mixes were prepared from this resin with magnesia and alumina using the procedure and proportions of materials as given in Mix 2 of Example 1. When test cores were prepared from freshly mixed material and baked at 166° C. for 2 hours, the cores made with magnesite had a tensile strength of 965 psi, and those prepared with alumina had a tensile strength of 388 psi. A core prepared after the mix with magnesite had been held for 20 hours also had a tensile strength of 965 psi. These results indicate that the isopropoxy modified liquid phenolic resole resin of this example gives refractory test specimens of comparable strength to those prepared with the methoxy modified liquid phenolic resole resins, and that refractory mixes prepared from it can be held after mixing without losing their usefulness.

Samples of the alkoxy modified resins of Examples 2 and 3 were held in closed glass jars at 40° C. to determine their storage stability. The commercial resole resin used in the comparative tests reported in Tables I and II and the refractory binder resin of Example 1 of U.S. Pat. No. 4,427,800 were stored in the same manner. The results are shown graphically in the drawing. The modified resins showed only slight viscosity increases (about 5% or less per week) under such storage conditions. In contrast, the viscosities of the comparative test resins showed an almost exponential increase in viscosity with their viscosities nearly doubling each week. This test shows the excellent storage stability of the resins of this invention and their superiority in this property over the conventional resole resins of the prior art.

Thus, it is apparent that there has been provided in accordance with the invention, a material for the preparation of refractories that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and broad scope of the appended claims.

What is claimed is:

1. A refractory mix consisting essentially of refractory particles, a preformed alkoxy modified phenolic resole resin and a polar solvent for the resin, said resin produced in the presence of a divalent metal ion catalyst and consisting essentially of a phenolic resole resin having at least one alkoxy methylene group for every 20 phenolic hydroxyl groups, said alkoxy methylene group having the general formula —$(CH_2O)_nR$ where R is the alkyl group of a primary or secondary monohydric aliphatic alcohol containing from 1 to 8 carbon atoms and n is a small positive integer, and said alkoxy modified phenolic resole resin being capable of forming an 80% by weight solution in a polar solvent, which solution shows an increase in viscosity of less than about 20% per week when held at 40° C. in a closed container. wherein the alkoxy modified phenolic resole resin comprises from about 1% to 25% by weight of the mix.

2. The refractory mix of claim 1 wherein the alkoxy modified phenolic resole resin is a methoxy modified phenolic resole resin.

3. The refractory mix of claim 2 wherein the phenolic resole resin is prepared from phenol and formaldehyde.

4. The refractory mix of claim 3 wherein the refractory particles comprise magnesite.

5. The refractory mix of claim 1 wherein the alkoxy modified phenolic resole resin is an isopropoxy modified phenolic resole resin.

6. The refractory mix of claim 5 wherein the phenolic resole resin is prepared from phenol and formaldehyde.

7. The refractory mix of claim 6 wherein the refractory particles comprises magnesite.

8. A refractory shaped article prepared by heating the refractory mix of claim 1.

9. A refractory shaped article prepared by heating the refractory mix of claim 2.

10. A refractory shaped article prepared by heating the refractory mix of claim 3.

11. A refractory shaped article prepared by heating the refractory mix of claim 4.

12. A refractory shaped article prepared by heating the refractory mix of claim 5.

13. A refractory shaped article prepared by heating the refractory mix of claim 6.

14. A refractory shaped article prepared by heating the refractory mix of claim 7.

* * * * *